Aug. 5, 1969     E. F. SWAZY ET AL     3,459,915
ELECTRICAL DISCHARGE MACHINING ELECTRODE COMPRISING
TUNGSTEN PARTICLES IN A SILVER MATRIX
Filed May 3, 1967

INVENTORS
EARL F. SWAZY
JAMES C. KENNEY
BY
ATTORNEY

United States Patent Office 3,459,915
Patented Aug. 5, 1969

3,459,915
ELECTRICAL DISCHARGE MACHINING ELECTRODE COMPRISING TUNGSTEN PARTICLES IN A SILVER MATRIX
Earl F. Swazy and James C. Kenney, Indianapolis, Ind., assignors to P. R. Mallory & Co., Inc., Indianapolis, Ind., a corporation of Delaware
Filed May 3, 1967, Ser. No. 635,744
Int. Cl. B23k 9/16
U.S. Cl. 219—69                                        11 Claims

ABSTRACT OF THE DISCLOSURE

An electrical discharge machining electrode material consisting of a thin cold rolled material constructed of silver and a refractory material wherein the refractory particles are from 4 to 20 microns in size and are in immediate contact with a continuous silver matrix.

---

Four main factors determine the suitability of any specific electrical discharge machining electrode material:
(1) The maximum possible machining rate;
(2) The wear ratio;
(3) The ease with which it can be shaped; and
(4) Its cost.

From purely technical considerations, materials such as a silver-tungsten alloy are the most efficient because they give the highest metal removal rate and have a low wear ratio. Unfortunately, their cost for most conditions is prohibitive because of the difficulty of fabricating the material into a variety of configurations and still maintain reasonable cutting rates, since in general materials that have good cutting rates have relatively low ductility.

The present invention is concerned with a novel electrode material for electrical discharge machining apparatus and has as one of its objects the provision of such an electrode material which is easily formed into various configurations.

Another object of the invention is the provision of such an electrode material which has a high electrical conductivity to yield good cutting rates.

Another object of the present invention is the provision of an electrode material composed of silver and a refractory material taken from the class consisting of tungsten and tungsten carbide, wherein the refractory particles are in intimate contact with the silver matrix.

Still another object of the invention is to provide such an electrode material which is fabricated as a thin body with sufficient ductility so that it can be readily formed into desired shapes.

Yet another object of the invention is to provide a bar rolling technique for forming such electrode material.

Another object of the invention is to provide a bar rolling technique wherein powders of the refractory material are blended with the silver, pressed into bars, sintered, cold rolled, and resintered and cold rolled with intermittent annealing treatments.

With the above and other objects in view, which will appear as the description proceeds, this invention resides in a novel electrode material for electrical discharge machining and a process for making the same such as substantially described herein, and more particularly defined by the appended claims, it being understood that such changes in the precise embodiment of the invention here disclosed may be made as come within the scope of the claims.

Figure 1:
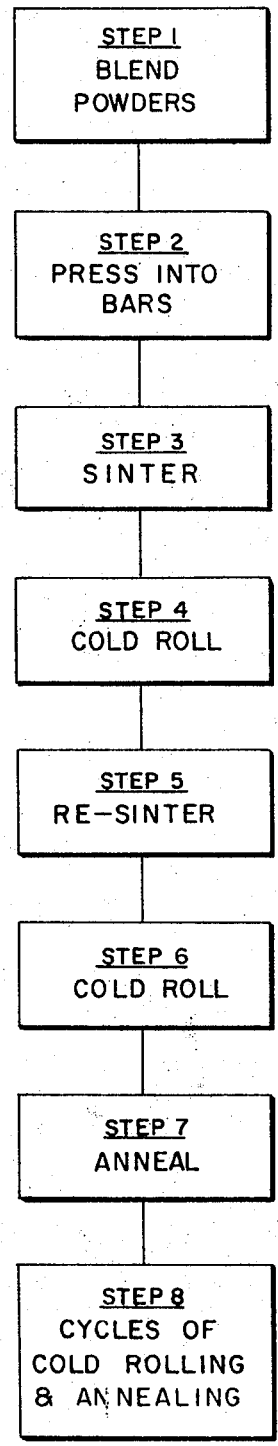
Figure 2:
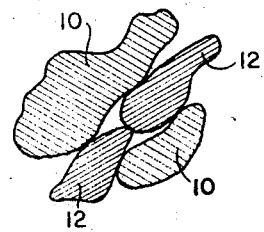
Figure 3:
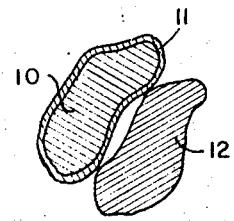
Figure 4:
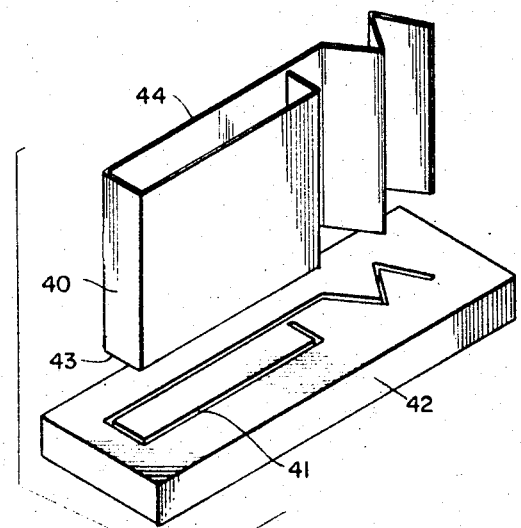

In the drawings:
FIGURE 1 is a flow sheet showing the various steps in forming the novel electrode material;
FIGURE 2 is an enlarged cross section of the powders of a silver-tungsten electrode material showing the microstructure resulting from commonly used prior art techniques of fabrication;
FIGURE 3 is an enlarged cross section of the powders of a silver-tungsten electrode showing the microstructure of the material of the present invention; and
FIGURE 4 is an exploded perspective view of a typical electrode configuration which can be formed by the material of the present invention, and the configuration cut by the electrode in a workpiece.

The invention in its broadest aspect contemplates providing as an article of manufacture an electrode material for electrical discharge machining having an active electrical discharge face fabricated of silver and a refractory material taken from the class consisting of tungsten and tungsten carbide, the powder particle size of the refractory material being from 4–20 microns with the refractory particles being in intimate contact with a continuous matrix of silver to yield an electrode material having good electrical discharge ability. Because of the bar rolling technique of the present invention wherein the starting materials are powder, the electrode can be easily formed in various electrode configurations. Such technique, in general, comprises blending a mixture of powders of a refractory material taken from the class consisting of tungsten and tungsten carbide and powders of silver, said refractory powders having a particle size of from 4–20 microns as measured by F.A.P.S. analysis, pressing said mixtures into bars, sintering said bars in a non-oxidizing atmosphere, cold rolling said bars, resintering and cold rolling said bars, annealing said bars to remove all rolled grain structure, and thereafter alternately cold rolling and annealing said bars until the desired electrode material thickness is obtained, and physical properties such as density and hardness are obtained.

Referring now to FIGURE 1, the first step in making the novel electrode material is that of blending the powders together. To this end, powders of silver which preferably have a particle size of from 8–10 microns by F.A.P.S. analysis are blended with the refractory powder having a particle size of from 4–20 microns by F.A.P.S. analysis. In general, if the particle size becomes excessively large, a good intimate electrical contact is difficult to achieve between the refractory and the silver and the electrical load carrying capability of the material is reduced; while on the other hand, if the tungsten particle size becomes too small, the material becomes brittle and cracks develop during the rolling operation. Preferably the particle size of the tungsten should be from about 6–20 microns, while for tungsten carbide it should be about 4–12 microns.

In general, the composition, that is, the weight percent of the refractory and silver is dependent upon the electrical properties desired and, in the case of the present invention, the rolling ability of the mixture. With too little silver the rolling operation becomes very difficult due to the high refractory material content. On the other hand, with too much silver the material loses its strength and desirable resistance to erosion. In general, silver in an amount of from about 15 to 90 percent by weight with the balance being the refractory material has been found to be suitable. Table I shows the ranges and the preferred percentages of silver for the named refractory materials of the invention.

TABLE I

| Refractory Material | Percent Ag by weight | |
|---|---|---|
| | Range | Preferred |
| Tungsten | 15–90 | 15, 27, 35, 50, 90 |
| Tungsten carbide | 50–80 | 50 |

The mixture is then, as shown in FIGURE 1, pressed into bars of a suitable shape by placing the mixture into a mold and applying pressure to it.

The bars are then, in step three, sintered in a non-oxidizing atmosphere in a furnace of either the muffle or open element type. The atmosphere may be a neutral atmosphere such as pure nitrogen, but a reducing atmosphere such as dissociated ammonia or pure hydrogen is preferred from the standpoint of reducing the tendency for the formation of oxide layers on the tungsten.

Sintering temperatures depend upon the particle size of the refractory material and composition of mix, the temperature, in general, being inversely proportional to both. The larger particle sizes, within the aforementioned range, tend to cause bleed-out of the silver or to cause the bars to deform. In such case, solid phase sintering at a temperature near the melting point of the silver (about 960° C.) is adequate. However, it is preferable to sinter above the melting point of silver. Bars which may be sintered above the melting point (liquid-phase) of silver are sintered in a range of from about 1000° C.–1130° C. Optimum temperature conditions are dependent upon the silver refractory composition of the mixture. And, in addition, enough refractory structure must be present to hold the silver matrix. For example, with a mixture of 50 percent silver, 50 percent tungsten, liquid phase sintering at temperatures up to 1130° C. can be used. With a 35%/65% mixture, liquid phase sintering with temperatures up to 1130° C. would be used. In any event the maximum temperature should be about 1130° C. to prevent excessive bleed-out of the silver.

A sintering temperature for up to 65% silver, balance tungsten carbide would be 1100° C. Greater silver contents within the ranges shown in Table I should be sintered at about 960° C.

Again referring to the drawing, after the bars have been sintered, they are cold rolled through a suitable rolling mill, the roll gap being set to about two-thirds of the bar's thickness to yield a one-third reduction in thickness in a single pass. With a one-third reduction, optimum economic rolling conditions are achieved without having a tendency for the bar to crack, especially along the edges.

As shown in step 5, following the cold rolling, the material is resintered. This step completely relieves the stresses of rolling and promotes rapid grain growth in the silver matrix to exclude voids. This void exclusion is a result of grain growth in the solid phase sinter and refractory particle wetting in liquid phase sintering. More important, the resinter step at this point provides for a continuous silver matrix, uninterrupted by a refractory skeleton as exists in prior art infiltrated materials. This continuous silver matrix provides better electrical properties with no expense of hardness. Electrical conductivity tests consistently indicate superior conductivity for these rolled silver-refractory materials over materials of the same composition produced by so-called standard infiltrating techniques.

In the cold rolling and resintering steps lie the heart of the invention. They are the steps that yield the novel electrical materials grain structure shown in FIGURE 2 wherein the refractory particles 10 are in intimate contact with the silver powder 12 forming the silver matrix. More specifically, it has been found that the cold rolling substantially eliminates the oxide barrier 11 of FIGURE 3 normally formed on the refractory particles, thus leaving a direct or intimate contact between the refractory particles and the silver matrix. While not desiring to be so limited, it is felt that the cold rolling step sets up an abrasive action between the refractory particles so as to cause the substantial elimination of the oxide barrier 11. Although there would be an abrasive action with hot rolling, there would still be the tendency to create an oxide layer due to the heat involved. The substantial elimination of the oxide barrier yields a better electrical contact between the tungsten particles and the silver matrix thus yielding increased electrical conductivity. As previously noted, the resintering step promotes grain growth so as to eliminate voids in the material.

As shown in FIGURE 1, in the next two steps the body is rolled and annealed and then as shown in the last step, the rolling and annealing is continued in cycles with a 10–30 percent reduction in thickness in each cycle until the desired properties of hardness, density, thickness, etc., are obtained. The optimum amount of reduction in thickness is a balance of reducing the thickness as quickly as possible without causing cracks in the rolled body and is dependent upon the silver-refractory composition of the original mixture.

For a 90 percent by weight of silver, 10 percent tungsten mixture, a 30 percent reduction would be optimum; for a 50%/50% mixture, 15 percent would be optimum; for a 35%/65% mixture, 10 percent would be optimum; and for a 27%/73% mixture, a 10 percent reduction per cycle would be optimum. For a 65% by weight silver-35% tungsten carbide composite, a 10% reduction would be optimum.

Annealing for all compositions consists of heating the rolled body in a reducing atmosphere such as dissociated ammonia at a temperature of about 900° C. for about one half hour. This procedure completely removes the rolled grain structure, permitting further reductions in thickness without cracking or splitting the bar.

Using the method herein described, electrode materials of a silver-refractory composition have been formed in very thin continuous strips or sheets for use in electrical discharge machining. These strips not only have good electrical conductivity due to the intimate contact of the refractory particles with the silver matrix, but also are readily formed into various electrode configurations. The formation of such materials is shown by the following two examples.

Example 1

A powder mixture of 50% sliver-50% tungsten by weight was pressed and sintered to a bar size of .125 inch in thickness. The particle size of the tungsten was about 6 microns, and the silver about 10 microns. The powders were pressed with a pressure of from about 20–25 ton/in.$^2$. They were sintered in an atmosphere of dissociated ammonia for about 20 minutes at a temperature of about 1130° C. The pressed bars were then cold rolled in air at a 30% thickness reduction for one pass. The bars were then resintered in an atmosphere of dissociated ammonia for about 5–10 minutes at a temperature of about 1000° C. After resintering the bars were then alternately cold rolled and annealed until a strip having a thickness of about .031 inch was produced. The annealing was done at a temperature of about 900° C. for about one half hour in an atmosphere of dissociated ammonia. The cold rolling was done in passes with a 10–15% reduction in each pass.

Example 2

A powder mixture of 65% silver-35% tungsten carbide by weight was pressed and sintered to a bar size of .100 inch in thickness. The particle size of the tungsten carbide was about 4 microns, and the silver about 10 microns. The powders were pressed with a pressure of from about 20–25 ton/in.$^2$. They were sintered in an atmosphere of dissociated ammonia for about 15 minutes at a temperature of about 1300° C. The bars were then cold rolled in air at a 30% thickness reduction for one pass. The bars were then resintered in an atmosphere of dissociated ammonia for about 5–10 minutes at a temperature of about 1200° C. After resintering the bars were then alternately cold rolled and annealed until a strip having a thickness of about .031 inch was produced. The annealing was done at a temperature of 900° C. for about one half hour in an atmosphere of dissociated ammonia. The cold rolling was done in passes having a 10% reduction in each pass.

Materials formed by the above described process have been readily formed into various and odd shaped electrode configurations such as illustrated in FIGURE 4. As shown in the figure the sheet 40 of the electrode material is formed into an odd shaped configuration to show the material's versatility. A cut 41 was then made in a workpiece 42 conforming to the configuration of the electrode, the cut being made from an arc discharge from the working end or face 43, it being understood that the opposite end 44 can also serve as the working or active face of the electrode. Cuts were made in a tungsten carbide workpiece. Other metals can also be as readily cut. The thickness of the material was about .020 inch and the width of the cut was such that the electrode material snugly fitted into the cut when the width was so checked. The cut was about an eighth of an inch deep.

From the foregoing description it will be apparent to those skilled in the art that this invention provides a new and useful electrode material for electric discharge machining. Accordingly, it is contemplated that the scope of the invention is to be determined from the claims appended hereto.

What is claimed is:

1. An electrical discharge machining electrode material having an active electrical discharge face comprising essentially a thin cold rolled body constructed of silver and a refractory material taken from the class consisting of tungsten and tungsten carbide, said electrode material being characterized by the refractory particles being in intimate contact with a continuous silver matrix and wherein said refractory material has a particle size of from 4–20 microns as measured by F.A.P.S. analysis.

2. An electrode material according to claim 1 wherein silver is in an amount of from 15–90 percent by weight, the balance being said refractory material.

3. An electrode material according to claim 1, wherein the refractory material is tungsten, and silver is in an amount of from 15–90 percent by weight.

4. An electrode material according to claim 3, wherein said silver is in an amount of 50 percent by weight, the balance being tungsten.

5. An electrode material according to claim 3, wherein the silver is in an amount of 35 percent by weight, the balance being tungsten.

6. An electrode material according to claim 3, wherein the silver is in an amount of 27 percent by weight, the balance being tungsten.

7. An electrode material according to claim 3, wherein the silver is in an amount of 90 percent by weight, the balance being tungsten.

8. An electrode material according to claim 1 wherein said body is in the form of sheets.

9. An electrode material according to claim 1, wherein said body is in the form of strips.

10. An electrode material according to claim 1, wherein said refractory material consists of tungsten carbide and said silver is in an amount of from about 50–80 percent by weight.

11. An electrode material according to claim 10, wherein said tungsten carbide is in an amount of 50 percent by weight.

References Cited

UNITED STATES PATENTS 3,244,852    4/1966    Herterick et al.

JOSEPH V. TRUHE, Primary Examiner

R. F. STAUBLY, Assistant Examiner

U.S. Cl. X.R.

204—143, 292; 219—119, 145, 149; 252—514, 515, 516